(12) United States Patent
Brownholtz et al.

(10) Patent No.: US 8,346,896 B2
(45) Date of Patent: Jan. 1, 2013

(54) USER PIVOT NAVIGATION OF SHARED SOCIAL MEDIA

(75) Inventors: Elizabeth A. Brownholtz, Andover, MA (US); Joan M. DiMicco, Brookline, MA (US); Casey Dugan, Medford, MA (US); Werner Geyer, Boston, MA (US); Jodi M. Large, Warwick, RI (US); David R. Millen, Boxford, MA (US); Michael Muller, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 653 days.

(21) Appl. No.: 12/017,056

(22) Filed: Jan. 21, 2008

(65) Prior Publication Data
US 2009/0187624 A1    Jul. 23, 2009

(51) Int. Cl.
*G06F 15/16* (2006.01)
(52) U.S. Cl. ........... 709/220; 709/225; 709/229; 705/51
(58) Field of Classification Search ................. 709/220, 709/225, 227, 224, 228; 705/51
See application file for complete search history.

(56) References Cited

U.S. PATENT DOCUMENTS

| | | | |
|---|---|---|---|
| 8,095,551 B2 * | 1/2012 | Kountz et al. | 707/758 |
| 2007/0043688 A1 * | 2/2007 | Kountz et al. | 707/1 |
| 2007/0106627 A1 * | 5/2007 | Srivastava et al. | 706/20 |
| 2007/0156594 A1 * | 7/2007 | McGucken | 705/51 |
| 2008/0040674 A1 * | 2/2008 | Gupta | 715/745 |
| 2008/0071796 A1 * | 3/2008 | Ghuneim et al. | 707/10 |
| 2008/0120411 A1 * | 5/2008 | Eberle | 709/225 |
| 2008/0182563 A1 * | 7/2008 | Wugofski et al. | 455/414.2 |
| 2008/0222295 A1 * | 9/2008 | Robinson et al. | 709/227 |

* cited by examiner

*Primary Examiner* — Khanh Dinh
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to social media navigation in a social network and provide a method, system and computer program product for user pivot for media sharing in a social network. In an embodiment of the invention, a social networking data processing system for user pivot navigation. The system can include a social network executing in a host server, the social network providing shared media for viewing by communicatively coupled clients. The system also can include user pivot logic coupled to the social network. The logic can include program code enabled to identify a user of the social network associated with shared media selected for display in a media view to a requesting user and to generate a navigation view in a consistent location in a user interface to the social network irrespective of a page view rendered in the user interface, the view providing a link to a profile page for the identified user.

15 Claims, 2 Drawing Sheets

USER PIVOT NAVIGATION OF SHARED SOCIAL MEDIA

BACKGROUND OF THE INVENTION

1. Field of the Invention

The present invention relates to the field of social networking and more particularly to navigational pivot points for social networks.

2. Description of the Related Art

A social network refers to a social structure of nodes each associated with a different person or organization. The interconnections of each node reflect direct relationships between the respective people and organizations such that the directness of a relationship between two persons or organizations associated with respective nodes can be summarized by the path of interconnections between the respective nodes. In this way, any one individual in a social network can evaluate the number and quality of social relationships with others in the network, those relationships ranging from close familial bonds to casual acquaintances.

The advent of the global Internet has changed the way in which social networks can be viewed. Originally, a mere visual tool describing a social phenomenon, computerized social networks facilitate the recognition and expansion of social networks amongst interacting users across the globe. Whereas geographic boundaries previously limited the extent and quality of a given social network, the global Internet enables limitless expansion of the social network based upon a vast set of aware collaborators coupled by the fabric of computer communications.

Commercial computerized social networks have become wildly popular in recent years—especially amongst the younger demographic. Examples include the MySpace™ computer socialized network maintained by MySpace, Inc. of Los Angeles, Calif., LinkedIn™ computerized business network maintained by LinkedIn Corporation of Palo Alto, Calif., and the Facebook™ computerized social network maintained by Facebook of Palo Alto, Calif. Commercial computerized social networks represent social networking services connecting users according to different types of interests in an aggregated view—generally a Web site hosting user contributed content through imagery and commentary.

Commercial computerized social networks allow users to create individual profiles. Each profile can include social media including imagery such as photographs of the user and things relevant to the user. Each profile further can include textual materials such as lifestyle information, or general writings. Notably, users can establish networks of favorite "friends". Favorite friends can be specified manually by a given user and often represent the individuals or organizations most favored by the given user. Each of the favorite friends can be presented in the Web site so as to allow linking to a corresponding profile for the favorite friend. In this way, an end user literally can navigate shared social media in the social network for a given user.

Generally, when navigating shared social media in a social network, users discover content by navigating along different parameters, such as media type or content ownership. However, the navigation user interface for navigating shared media in a social network lacks consistency and varies from display to display. In a social media system, the user or group of users is the fundamental organizing concept, and all other data (such as photographs and textual materials) are to be interpreted in the context of their creator or creators.

It is therefore important during browsing or searching for the user to be able to understand who has created the content being browsed, and preferably to understand some additional information about that creator. If information about the creator is displayed inconsistently, or is hidden from view, the task of the user becomes more difficult. Further, oftentimes a photo or textual reference to a user in a social network is provided in connection with content associated with or owned by the user. However, when a user name or photo of a user in a social network is presented, selecting the user name or photo results in a display of the profile page for the user only.

BRIEF SUMMARY OF THE INVENTION

Embodiments of the present invention address deficiencies of the art in respect to social media navigation in a social network and provide a novel and non-obvious method, system and computer program product for user pivot for media sharing in a social network. In an embodiment of the invention, a social networking data processing system for user pivot navigation can be provided. The system can include a social network executing in a host server, the social network providing within a page a shared media view of shared media for viewing by communicatively coupled clients. The system also can include a navigation view generated by the social network to be separate from the shared media view. The system yet further can include user pivot logic coupled to the social network. The logic can include program code enabled to identify a user of the social network associated with shared media selected for display in the shared media view to a requesting user and to provide a link to content in a profile page for the identified user within the navigation view.

In another embodiment of the invention, a method for user pivot navigation of social media in a social network can be provided. The method can include rendering both a shared media pane and a separate navigation pane in a page view of a social network, identifying a user associated with shared media in the shared media pane, and creating a profile page link to content in a profile for the identified user in the navigation pane. Identifying a user associated with shared media in the media pane can include identifying a set of users associated with shared media in the shared media pane and creating a profile page link to content in a profile page for the identified user in the navigation pane. Yet further, the method can include arranging each profile page link for each identified user in the set according to a role for each identified user in the shared media.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for user pivot navigation of social media in a social network. In accordance with an embodiment of the present invention, shared media content can be selected for display in a display pane for a social networking system. A user or users in the social network associated with the content can be identified. Thereafter, a separate navigation pane can be populated with a link to a profile page for each identified user, and can be displayed in every page view. In this way, one can pivot navigate on a selected user presented in association with contemporaneously viewed shared media content.

Figure 1A:
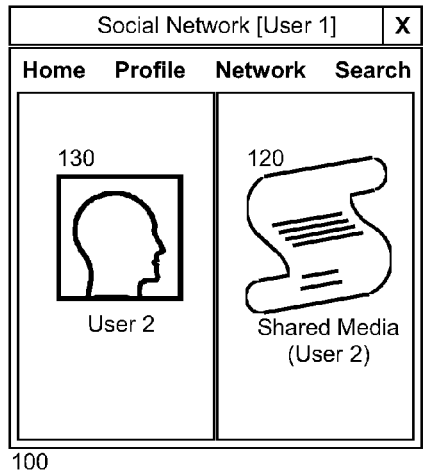
FIGS. 1A through 1C, taken together, are a pictorial illustration of a social networking user interface configured for user pivot navigation of social media.
Figure 1B:
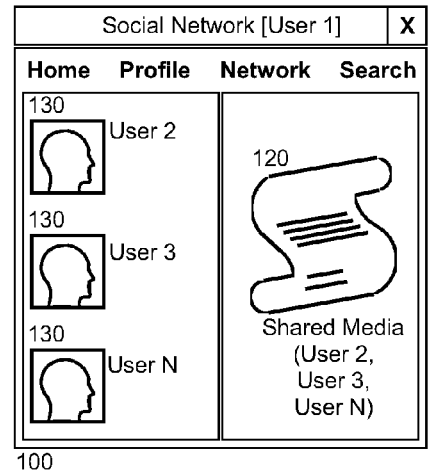
Figure 1C:
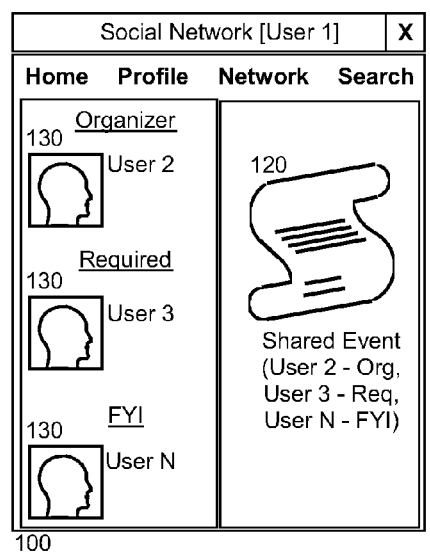

In further illustration, FIGS. 1A through 1C, taken together, pictorially depict a social networking user interface configured for user pivot navigation of social media. Considering first FIG. 1A, a social networking user interface 100 can be provided. The user interface 100 can include two separate panes—a first showing shared media 120 associated with a particular user and a navigation pane showing a link 130 for the particular user associated with the shared media 120. Importantly, the navigation pane can be placed consistently in substantially the same position in the social networking user interface 100 irrespective of a page view provided in the social networking user interface 100. Alternatively, the navigation pane can be placed in a window separate from the user interface 100.

Optionally, the link 130 for the particular user can include a thumbnail image of the particular user, which can be added by the user or which can be provided through reference to a directory of users. Further, additional directory-supplied information can be copied from the profile page. Yet further, an image of the user can be associated with the link 130 to the profile page of the user. Even yet further, information pertaining to the user can be provided in connection with the link 130 in the navigation pane and can include additional data about the user, including the content of selected textual fields from the profile page of the user, user-supplied photos from the profile page, or other system-provided data. Finally, the link 130 can be activated to invoke content in a profile page of the particular user associated with the shared media 120

Referring now to FIG. 1B, it will be recognized that the shared media 120 can include multiple different portions of content, such as that produced in search results, each portion being associated with a different user 130. As such, the navigation pane can provide a set of links 130, each for a different one of the users 130 associated with the shared media 120. Even further, as shown in FIG. 1C, the shared media 120 can be by way of example, a calendared event with multiple different associated users 130. However, the different users 130 can fulfill different roles in the event. Thus, the navigation pane can arrange the users 130 in the navigation pane according to role.

Figure 2:
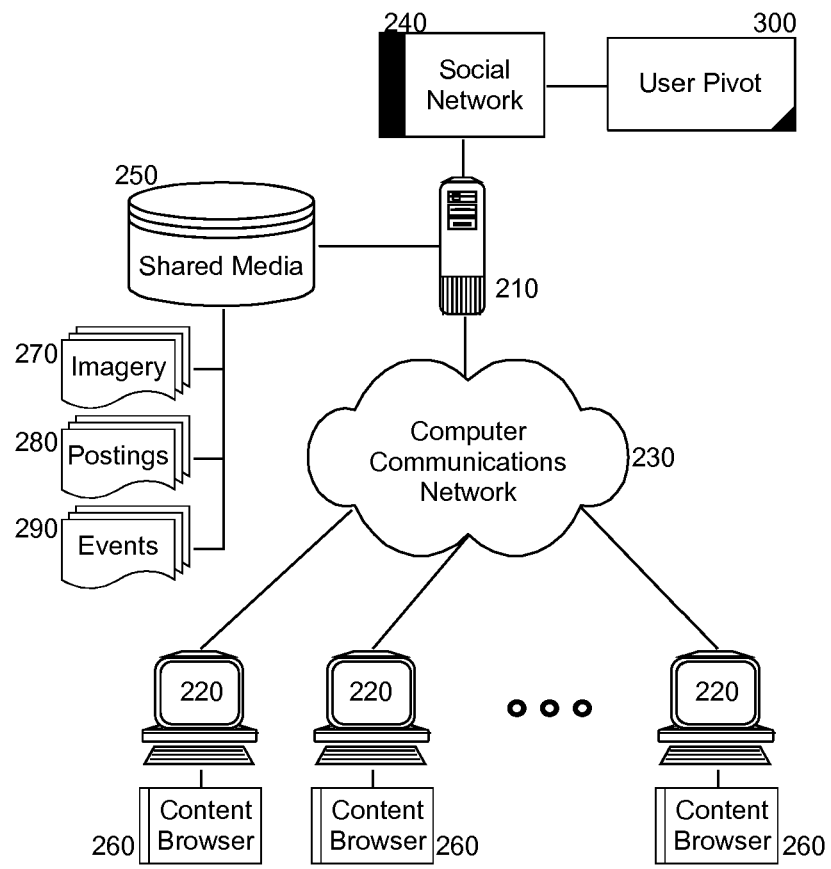
FIG. 2 is a schematic illustration of a social networking data processing system configured for user pivot navigation of social media; and, FIG. 3 is a flow chart illustrating a process for user pivot navigation of social media in a social network.

The user interface 100 shown in FIGS. 1A through 1C can be provided by way of a social networking data processing system. In illustration, FIG. 2 schematically depicts a social networking data processing system configured for user pivot navigation of social media. The system can include a host server 210 configured for communicative coupling to multiple different clients 220 over computer communications network 230. The host server 210 can support the operation of a social network 240 through which end users can access shared media 250 managed by the social network 240 by way of respective content browsers 260. In this regard, the shared media 250 can include not only imagery 270 and postings 280, but also calendared events 290.

Notably, user pivot logic 300 can be coupled to the social network 240. The user pivot logic 300 can include program code enabled to identify a social network user or users associated with shared media 250 selected for inclusion in a page view requested by an end user through a corresponding one of the content browsers. In this regard, the social network user or users can be the "owner" of the shared media 250, or merely implicated expressly by the shared media 250 selected for inclusion in the page view. In any event, the program code can be further enabled to generate a user pivot navigation pane for every page view in which one or more user links can be provided for each user identified in association with the shared media 250. The links can be activated to invoke a profile page for a corresponding user. Thus, in each page view one can pivot navigate on a user associated with the content in the page view.

Figure 3:
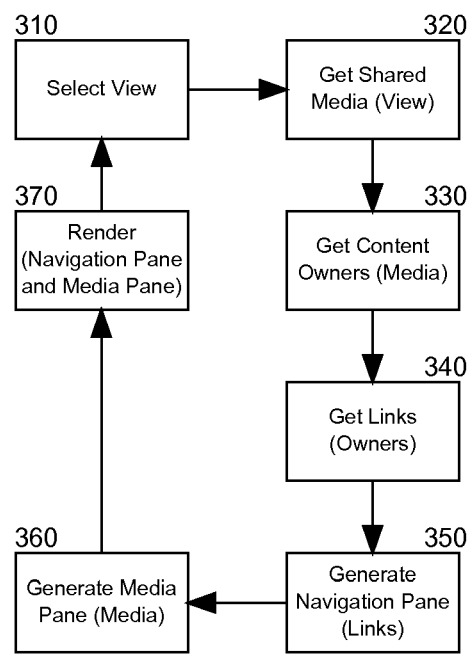

In yet further illustration of the operation of the user pivot logic 300, FIG. 3 is a flow chart illustrating a process for user pivot navigation of social media in a social network. Beginning in block 310, a page view can be selected in a social network and in block 320, shared media to be included in the page view can be retrieved. In block 330, users associated with the shared media can be determined and in block 340 a link can be created for each determined user. Thereafter, in block 350 a navigation page can be generated for the link or links and in block 360 a media pane can be generated for the shared media. Finally, in block 370 the page view can be rendered with both the media view and the navigation view.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain or store the program for use by or in connection with the instruction execution system, apparatus, or device. The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A social networking data processing system configured for user pivot navigation of social media, the system comprising:
   a host server comprising a computer with at least one processor and memory;
   a social network executing in the host server, the social network providing within a page a shared media view of shared media for viewing by communicatively coupled clients;
   a navigation view generated by the social network to be separate from the shared media view; and,
   user pivot logic coupled to the social network, the logic comprising program code enabled to identify a user of the social network associated with shared media selected for display in the shared media view to a requesting user and to provide a link to content in a profile page for the identified user within the navigation view.

2. The system of claim 1, wherein the link is a photo of the identified user.

3. The system of claim 1, wherein the navigation view is disposed in a consistent position in the page for every page of the social network.

4. The system of claim 1, wherein the navigation view is disposed in a window separate from the page.

5. The system of claim 1, wherein the program code is further enabled to identify multiple different users of the social network associated with shared media selected for display in the shared media view to a requesting user and to provide a link to content in a profile page for each of the identified users within the navigation view.

6. The system of claim 5, wherein the identified users are associated with the shared media by way of different roles.

7. The system of claim 6, wherein the navigation view provides a link to content in a profile page for each of the identified users and wherein the links are arranged in the navigation view according to the different roles.

8. A method for user pivot navigation of social media in a social network, the method comprising:
   rendering both a shared media pane and a separate navigation pane in a page view of a social network rendered in a content browser executing in memory by at least one processor of a computer;
   identifying a user associated with shared media in the shared media pane; and,
   creating profile page link to content in a profile for the identified user in the navigation pane.

9. The method of claim 8, wherein identifying a user associated with shared media in the media pane, comprises identifying a set of users associated with shared media in the shared media pane.

10. The method of claim 9, wherein creating profile page link to content in a profile for the identified user in the navigation pane, comprises creating a profile page link to content in a profile page for each identified user in the set in the navigation pane.

11. The method of claim 9, further comprising arranging each profile page link for each identified user in the set according to a role for each identified user in the shared media.

12. A computer program product comprising a computer usable storage device embodying computer usable program code for user pivot navigation of social media in a social network, the computer program product comprising:
   computer usable program code for rendering both a shared media pane and a separate navigation pane in a page view of a social network;
   computer usable program code for identifying a user associated with shared media in the shared media pane; and,
   computer usable program code for creating profile page link to content in a profile for the identified user in the navigation pane.

13. The computer program product of claim 12, wherein the computer usable program code for identifying a user associated with shared media in the shared media pane, comprises computer usable program code for identifying a set of users associated with shared media in the shared media pane.

14. The computer program product of claim 13, wherein the computer usable program code for creating profile page link to content in a profile for the identified user in the navigation pane, comprises computer usable program code for creating a profile page link to content in a profile page for each identified user in the set in the navigation pane.

15. The computer program product of claim 14, further comprising computer usable program code for arranging each profile page link for each identified user in the set according to a role for each identified user in the shared media.

* * * * *